United States Patent
Li

(10) Patent No.: US 10,748,329 B2
(45) Date of Patent: Aug. 18, 2020

(54) IMAGE PROCESSING METHOD AND APPARATUS

(71) Applicant: ZTE Corporation, Shenzhen (CN)

(72) Inventor: Rong Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/311,326

(22) PCT Filed: Jun. 20, 2017

(86) PCT No.: PCT/CN2017/089213
§ 371 (c)(1),
(2) Date: Dec. 19, 2018

(87) PCT Pub. No.: WO2017/219963
PCT Pub. Date: Dec. 28, 2017

(65) Prior Publication Data
US 2019/0236837 A1 Aug. 1, 2019

(30) Foreign Application Priority Data
Jun. 20, 2016 (CN) .......................... 2016 1 0442652

(51) Int. Cl.
*G06T 15/00* (2011.01)
*G06T 15/20* (2011.01)
(Continued)

(52) U.S. Cl.
CPC .............. *G06T 15/205* (2013.01); *G06T 7/00* (2013.01); *G06T 19/006* (2013.01)

(58) Field of Classification Search
CPC ........ G06T 19/006; G06T 7/00; G06T 15/205
(Continued)

(56) References Cited

U.S. PATENT DOCUMENTS 8,226,011 B2 * 7/2012 Merkli .................... A63F 13/02
235/462.46
8,564,618 B2 * 10/2013 Ryu ...................... G06F 1/1626
345/629

(Continued)

FOREIGN PATENT DOCUMENTS

| CN | 102360489 A | 2/2012 |
| CN | 103646426 A | 3/2014 |
| CN | 103679788 A | 3/2014 |

OTHER PUBLICATIONS

Tuts+Design, Create 3D Objects by Inflating 2D Photographs in Photoshop CS6 Extended, https://www.youtube.com/watch?v=kqAi5mNa2gM, Nov. 14, 2012.*

(Continued)

*Primary Examiner* — Phu K Nguyen
(74) *Attorney, Agent, or Firm* — Cantor Colburn LLP

(57) ABSTRACT

An image processing method and apparatus belong to the technical field of image processing. The method is applied to a mobile terminal, and includes: acquiring a target image on a Two-dimensional (2D) image (S11); creating a Three-Dimensional (3D) image layer, taking the 2D image as a background of the 3D image layer, and creating a background frame on the 3D image layer (S12); detecting an orientation of the mobile terminal, and adjusting a shape of the background frame according to the orientation of the mobile terminal, so that different areas of the 2D image are moved into or out of the background frame (S13); and when the target object on the 2D image is not completely accommodated within the background frame, drawing the target object at a position of the target object on the 3D image layer (S14), where the 2D image, the background frame, and the drawn target object on the 3D image layer are sequentially stacked from bottom to top. The method and the apparatus (Continued)

implement the effect that the 2D image is presented as a 3D effect on the mobile terminal.

20 Claims, 12 Drawing Sheets

(51) Int. Cl.
    *G06T 7/00*     (2017.01)
    *G06T 19/00*     (2011.01)

(58) Field of Classification Search
    USPC .......................................................... 345/418
    See application file for complete search history.

(56) References Cited

U.S. PATENT DOCUMENTS

| | | | |
|---|---|---|---|
| 9,110,499 B2* | 8/2015 | Griffin | G06F 1/1626 |
| 9,311,884 B2* | 4/2016 | Akiyama | G09G 3/20 |
| 9,313,409 B2* | 4/2016 | Kim | H04N 5/2628 |
| 9,691,184 B2* | 6/2017 | Blanchflower | H04L 67/38 |
| 9,875,600 B2* | 1/2018 | Arumugam | G07F 17/3255 |
| 10,171,728 B2* | 1/2019 | Shinozaki | H04N 5/23229 |
| 10,318,120 B2* | 6/2019 | Kwak | G06F 3/0412 |
| 2008/0278487 A1 | 11/2008 | Gobert | |

OTHER PUBLICATIONS

Smoke Learning Channel, Making 2D into 3D: Extruding a Flat Logo into a 3D Object , https://www.youtube.com/watch?v=Iwpffc28hUE, Sep. 18, 2013.*

How 2 Do That, 2D to 3D Photo Effect Using Mobile, https://www.youtube.com/watch?v=4EG5bTvx4Kg, Jan. 19, 2017.*

International Search Report for corresponding application PCT/CN2017/089213 filed Jun. 20, 2017; dated Sep. 1, 2017.

* cited by examiner

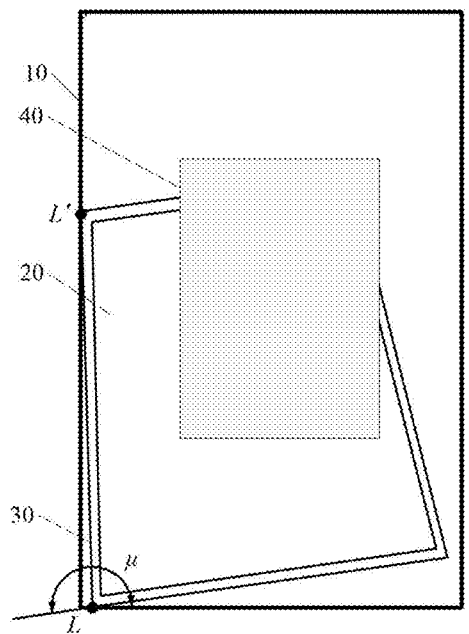
Fig. 7c
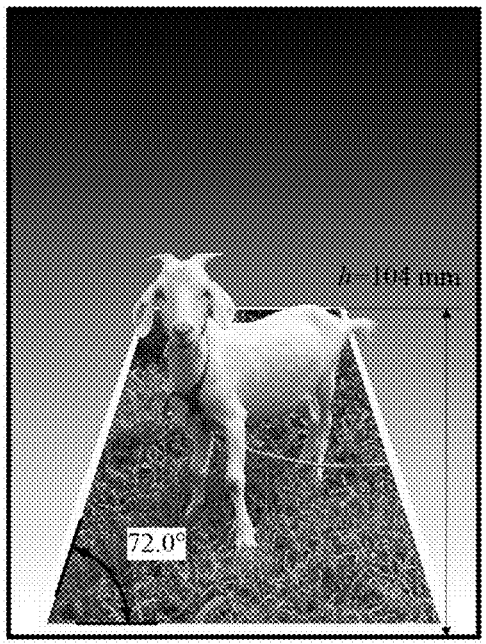
Fig. 8a1

Fig. 8a2

IMAGE PROCESSING METHOD AND APPARATUS

TECHNICAL FIELD

The present disclosure relate to the technical field of image processing, and more particularly, to an image processing method and apparatus.

BACKGROUND

In an image processing technology, a Two-Dimensional (2D) image may be presented as a Three-Dimensional (3D) effect by using a perspective skill. In related art, it is common to make an image with a 3D effect by using an image making tool on a computer. For example, a user may make the 2D image into a 3D image with a perspective effect by using a Photoshop and through a series of complex operation procedures such as matting, drawing and calculating a perspective matrix. However, such a processing manner requires the user to have a certain specialized technical level on one hand and thus is not suitable for an ordinary user; and on the other hand, with a complex algorithm and a large calculated amount, it can only be operated on the computer and cannot be migrated to a mobile terminal.

Therefore, the 2D image cannot be presented as the 3D effect by the existing image processing method on the mobile terminal.

SUMMARY

The embodiments of the present disclosure provide an image processing method and apparatus to at least solve the technical problem that a 2D image cannot be represented as a 3D effect on a mobile terminal.

Technical solutions adopted by the embodiments of the present disclosure to solve the above technical problems are as follows.

According to an embodiment of the present disclosure, an image processing method is provided, which is applied to a mobile terminal and may include the following steps: a target image is acquired on a 2D image; a 3D image layer is created, the 2D image is taken as a background of the 3D image layer, and a background frame is created on the 3D image layer; an orientation of a mobile terminal is detected, and a shape of the background frame is adjusted according to the orientation of the mobile terminal, so that different areas of the 2D image are moved into or out of the background frame; when the target object on the 2D image is not completely accommodated within the background frame, the target object is drawn at a position of the target object on the 3D image layer; wherein the 2D image, the background frame, and the drawn target object on the 3D image layer are sequentially stacked from bottom to top.

In an embodiment, the orientation of the mobile terminal may include an elevation angle or/and an azimuthal angle of the mobile terminal; and the shape of the background frame may include at least one of a height of the background frame, a first included angle between a bottom edge and a side edge of the background frame or a second included angle between the bottom edge of the background frame and a bottom edge of the 3D image layer, where the second included angle μ in the embodiments of the present disclosure may be an obtuse angle, a flat angle or a reflex angle.

In an embodiment, the step that a shape of the background frame is adjusted according to the orientation of the mobile terminal may include: the height or/and the first included angle of the background frame is adjusted according to the elevation angle of the mobile terminal.

In an embodiment, the elevation angle is negatively correlated with the height or/and the first included angle of the background frame.

In an embodiment, the step that a shape of the background frame is adjusted according to the orientation of the mobile terminal may include: the second included angle is adjusted according to the azimuthal angle of the mobile terminal.

In an embodiment, the azimuthal angle is negatively correlated with the second included angle.

In an embodiment, the step that the second included angle is adjusted according to the azimuthal angle of the mobile terminal may include the following step: according to the size of the azimuthal angle of the mobile terminal, the background frame is rotated for a certain angle with a reference point as a center to adjust the size of the second included angle.

In an embodiment, the reference point is a vertex of the background frame.

In an embodiment, the step that a shape of the background frame is adjusted according to the orientation of the mobile terminal may include: whether the orientation of the mobile terminal meets a set condition or not is judged; when the orientation of the mobile terminal meets the set condition, the shape of the background frame is adjusted to a shape corresponding to the orientation of the mobile terminal; and when the orientation of the mobile terminal does not meet the set condition, a current shape of the background frame is kept unchanged.

In an embodiment, when the orientation of the mobile terminal includes the elevation angle or the azimuthal angle of the mobile terminal, the step that whether the orientation of the mobile terminal meets a set condition or not is judged may include: whether the elevation angle or the azimuthal angle of the mobile terminal is within a set range or not is judged;

when the elevation angle or the azimuthal angle of the mobile terminal is within the set range, it is determined that the orientation of the mobile terminal meets the set condition; or otherwise, it is determined that the orientation of the mobile terminal does not meet the set condition.

In an embodiment, before the step that a shape of the background frame is adjusted according to the orientation of the mobile terminal, the method may further include the following step: a background color is filled in an area out of the background frame on the 3D image layer, where a depth of the background color gradually changes from one direction to another direction.

According to another embodiment of the present disclosure, an image processing apparatus is also provided, which is applied to a mobile terminal, and may include: an acquisition module, a creation module, an adjustment module and a drawing module.

The acquisition module is configured to acquire a target image on a 2D image. The creation module is configured to create a 3D image layer, take the 2D image as a background of the 3D image layer, and create a background frame on the 3D image layer. The adjustment module is configured to detect an orientation of a mobile terminal, and adjust a shape of the background frame according to the orientation of the mobile terminal, so that different areas of the 2D image are moved into or out of the background frame. The drawing module is configured to draw, when the target object on the 2D image is not completely accommodated within the background frame, the target object at a position of the target object on the 3D image layer. The 2D image, the background frame, and the drawn target object on the 3D image layer are sequentially stacked from bottom to top.

In an embodiment, the orientation of the mobile terminal may include an elevation angle or/and an azimuthal angle of the mobile terminal; and the shape of the background frame may include at least one of a height of the background frame, a first included angle between a bottom edge and a side edge of the background frame or a second included angle between the bottom edge of the background frame and a bottom edge of the 3D image layer.

In an embodiment, the apparatus may further include a filling module; and the filling module is configured to fill, after the adjustment module adjusts the shape of the background frame, a background color in an area out of the background frame on the 3D image layer, where a depth of the background color gradually changes from one direction to another direction.

According to a still another embodiment of the present disclosure, a storage medium is provided, which is configured to store a computer program for executing the above-mentioned image processing method.

in the embodiments of the disclosure, by acquiring the target object of the 2D image, taking the 2D image as the background of the 3D image layer and creating the background frame, adjusting the shape of the background frame along with a change of the orientation of the mobile terminal so that the different areas of the 2D image are moved into or out of the background frame, and when the target object in the 2D image is moved out of the background frame, drawing the target object, a perspective effect is created, the target object appears on the 3D image layer to present a lifelike 3D perspective effect, and the effect that the 2D image is presented as the 3D effect on the mobile terminal s implemented.

By adopting the image processing method in the embodiments of the present disclosure, the implementation is simple, a perspective matrix does not need to be calculated, the calculated amount is low, the imaging speed is fast and thus it is very easy to implement on the mobile terminal; moreover, the operation is simple and convenient, and a user can adjust different 3D display effects by only changing the orientation of the mobile terminal; and meanwhile, by setting a constraint condition, the abnormal display may be prevented and thus the effect is stable and reliable.

BRIEF DESCRIPTION OF THE DRAWINGS

FIG. 7a is a schematic diagram after a target object is drawn on FIG. 5a.

FIG. 7c is a schematic diagram after a target object is drawn on FIG. 5c.

FIG. 8a1 is a 3D perspective effect diagram appeared at last after a 2D image in FIG. 2 is processed in an embodiment of the present disclosure.

FIG. 8a2 is another 3D perspective effect diagram appeared at last after a 2D image in FIG. 2 is processed in an embodiment of the present disclosure.

The objective implementation, functional characteristics and advantages of the present disclosure will be further described in combination with embodiments and with reference to accompanying drawings.

DETAILED DESCRIPTION OF THE EMBODIMENTS

In order for clearer explanations of purposes, technical solutions and advantages of the present disclosure, the present disclosure is further described in details in combination with the accompanying drawings and the embodiments below. It should be understood that the specific embodiments described herein are only for the purpose of explaining the present disclosure but not for limiting the present disclosure.

Embodiment 1

Figure 1:
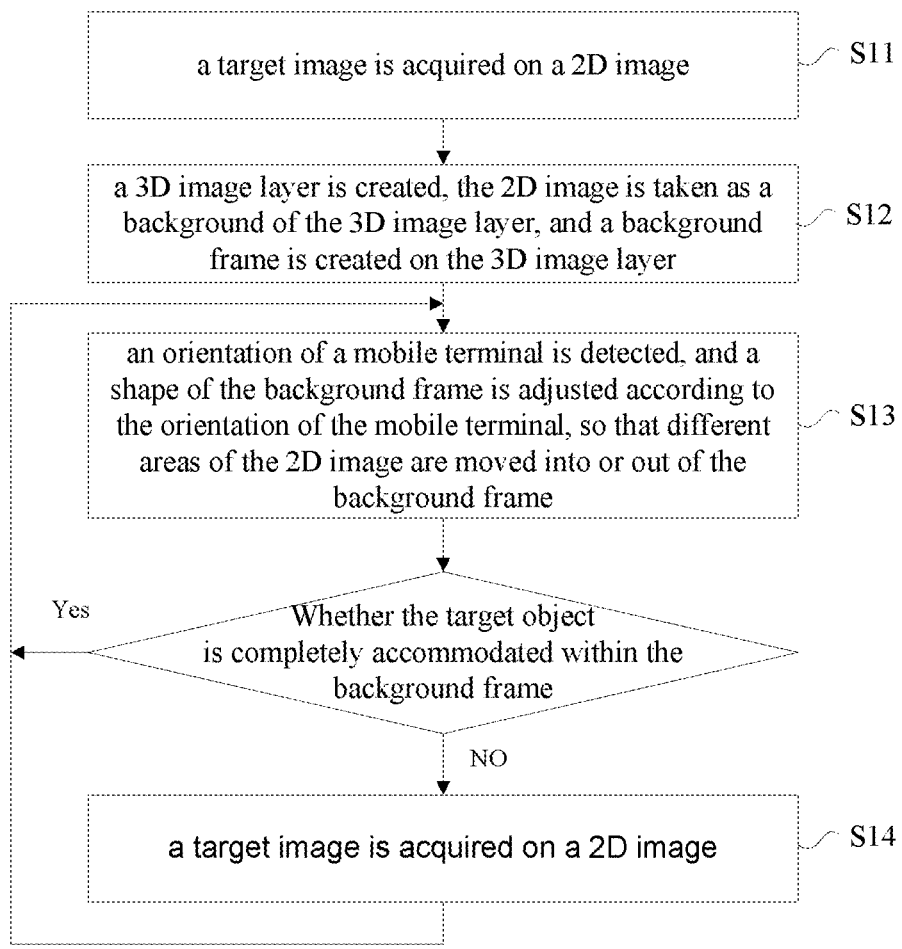
FIG. 1 is a flowchart of an image processing method according to a first embodiment of the present disclosure.

Referring to FIG. 1, a first embodiment of the present disclosure discloses an image processing method. The method is applied to a mobile terminal and may include the following steps.

At S11, a target image is acquired on a 2D image.

Specifically, the target image on the 2D image may be acquired by using a matting method. A basic principle of the matting is to divide an image into a background area, a foreground area and an unknown area, and then pick up a corresponding area. At present, the background area and the foreground area may be effectively identified by a plurality of matting algorithms and optimization methods and the unknown area is classified to the background or foreground area (for more details, refer to the Chinese Patent Application No. CN201010585533.2, CN201010102033.8 or CN201510249640.0). There is an only need for a user to input a sampling point of each of the background area and the foreground area via a graffiti marker, a frame type marker or other manners. For a portrait, the whole portrait may further be picked up automatically via a face recognition algorithm, an anchorage ground setting algorithm and a growing algorithm (for more details, refer to the Chinese Patent Application No. CN201510816708.9).

Figure 2:
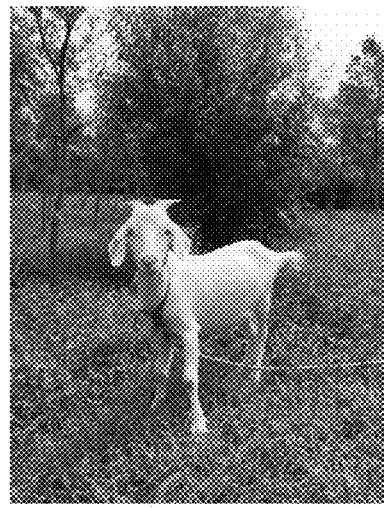
FIG. 2 is a schematic diagram of a 2D image in an embodiment of the present disclosure.
Figure 3:
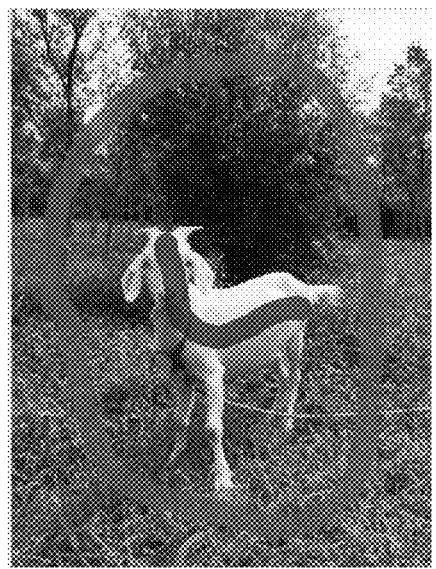
FIG. 3 is a schematic diagram showing that a target object is selected on a 2D image in an embodiment of the present disclosure.

For example, the mobile terminal displays the 2D image as shown in FIG. 2 and prompts the user of inputting the sampling point of each of a foreground and a background; and the user may draw the sampling point of each of the foreground and the background on a screen of the mobile terminal via a graffiti manner. As shown in FIG. 3, tracks scratched by a finger of the user are the sampling points, where the foreground is indicated by a non-closed curve and the background is indicated by a closed curve. There may be a plurality of foregrounds, and at this moment, the target object refers to a set of all foreground objects. In FIG. 3, the mobile terminal identifies, according to the sampling points input by the user, a goat as the target object and thus the goat in the 2D image is acquired to take as the target object.

At S12, a 3D image layer is created, the 2D image is taken as a background of the 3D image layer, and a background frame is created on the 3D image layer.

Figure 4:
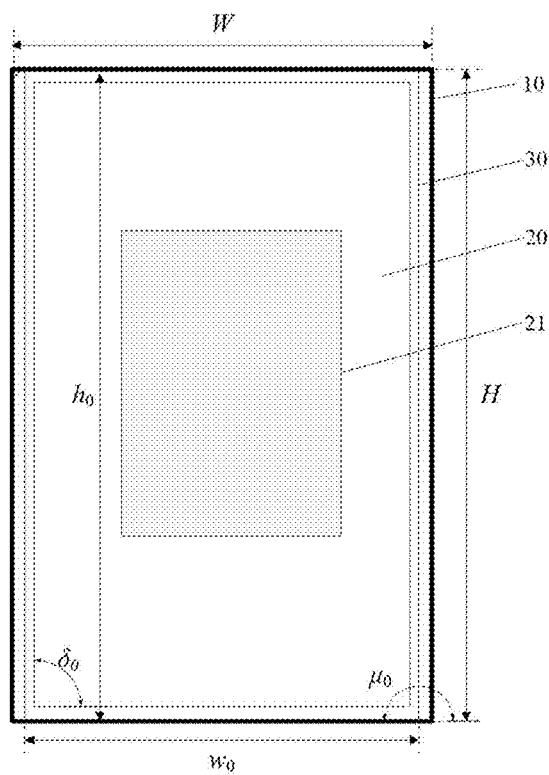
FIG. 4 is a schematic diagram of a 3D image layer in an embodiment of the present disclosure.

Specifically, as shown in FIG. 4, after the mobile terminal acquires the target object on the 2D image, the 3D image layer 10 is created, and the 2D image 20 is placed on the 3D image layer 10 (or the 2D image 20 is drawn on the 3D image layer 10) to take as the background of the 3D image layer 10. Where, a width W and a height H of the 3D image layer 10 are preferably equal to a width and a height of the 2D image 20, i.e., the 2D image overspreads the whole 3D image layer 10.

Then, the background frame 30 is created on the 3D image layer 10. The background frame 30 is stacked on the 2D image 20. The background frame 30 in an initial state at least accommodates a part of areas of the 2D image 20, i.e., the user may see a part of 2D image 20 via a window of the background frame 30. Optionally, the background frame 30 in the initial state at least accommodates the target object 21 of the 2D image 20 in part or in whole; in other words, the user may see a part of the target object 21 or the whole target object 21 via the window of the background frame 30.

As shown in FIG. 4, the background frame 30 has initial width, height, first included angle between a side edge and a bottom edge, and second included angle between a bottom edge and a bottom edge of the 3D image layer of $w_0$, $h_0$, $\delta_0$ and $\mu_0$ respectively. Optionally, the initial width $w_0$ is any positive integer smaller than or equal to W, the initial height $h_0$=H, the initial first included angle $\delta_0$=90°, the initial second included angle $\mu_0$=180°, and the background frame is centered in default. In FIG. 4, the target object 21 is completely accommodated within the background frame 30.

At S13, an orientation of a mobile terminal is detected, and a shape of the background frame is adjusted according to the orientation of the mobile terminal, so that different areas of the 2D image are moved into or out of the background frame. Whether the target object is completely accommodated within the background frame or not is judged. When the target object is not completely accommodated within the background frame, the step S14 is executed and the target object is drawn. When the target object is completely accommodated within the background frame, the target object is not drawn, the step S12 is returned and the shape of the background frame is adjusted by continuously detecting the orientation of the mobile terminal.

Figure 5A:
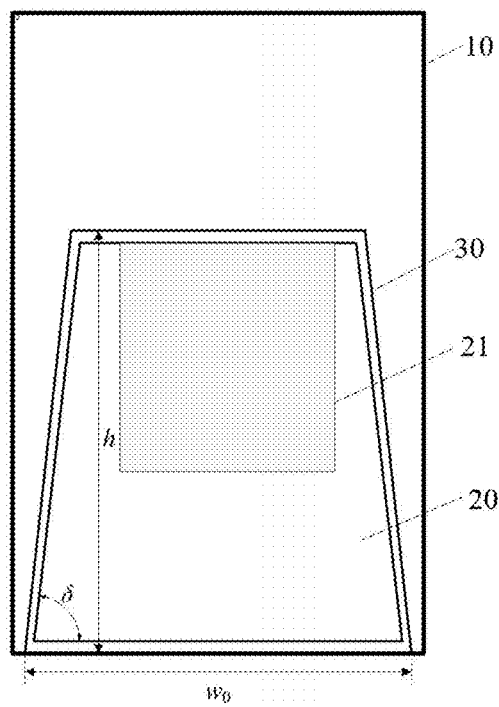
FIG. 5a is a schematic diagram showing that a height and a first included angle of a background frame are adjusted according to an elevation angle of a mobile terminal in an embodiment of the present disclosure.
Figure 5B:
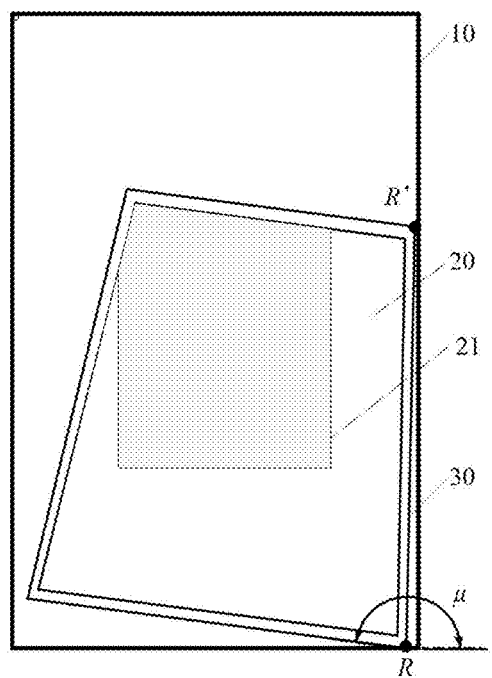
FIG. 5b is a schematic diagram showing that a second included angle of a background frame is adjusted according to an azimuthal angle of a mobile terminal in an embodiment of the present disclosure.
Figure 5C:
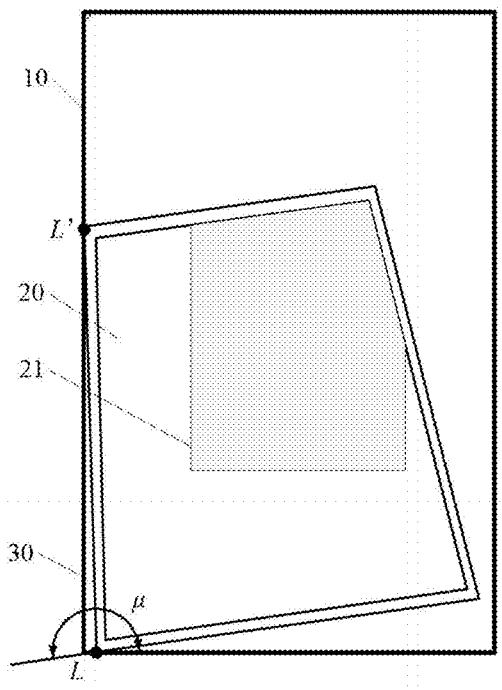
FIG. 5c is another schematic diagram showing that a second included angle of a background frame is adjusted according to an azimuthal angle of a mobile terminal in an embodiment of the present disclosure.

In the step S13, when the orientation of the mobile terminal changes, the shape such as a form and a size of the background frame also changes, so that the different areas of the 2D image are moved into or out of the background frame. Since the background frame is stacked on the 2D image, an area, moved into the background frame, of the 2D image may be viewed by the user via a window of the background frame; and an area moved out of the background frame is blocked and covered by the background frame and cannot be viewed by the user. In other words, along with the change in the shape of the background frame, an area, viewed by the user, of the 2D image also changes. As shown in FIG. 5a, FIG. 5b and FIG. 5c, after the shape of the background frame 30 changes, only one part of the target object 21 on the 2D image 20 is accommodated within the background frame 30, and the other part of the target object 21 is moved out of the background frame 30.

In an embodiment, the orientation of the mobile terminal includes an elevation angle or/and an azimuthal angle of the mobile terminal. The user changes the elevation angle via rotating the mobile terminal back and forth and changes the azimuthal angle by rotating the mobile terminal left and right. The elevation angle and the azimuthal angle may be detected by a sensor such as a gyroscope.

Figure 6A:
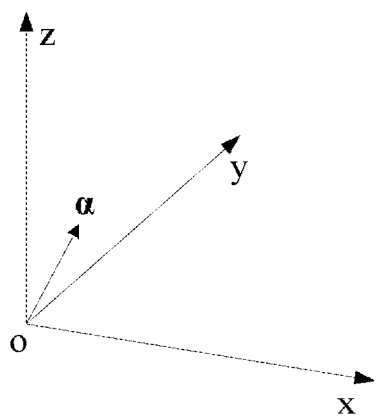
FIG. 6a is a schematic diagram of a coordinate established in an embodiment of the present disclosure.
Figure 6B:
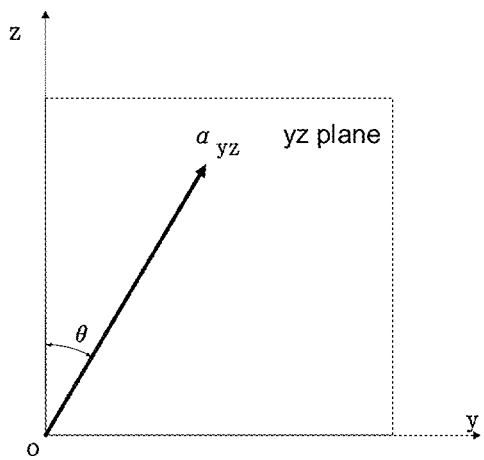
FIG. 6b is a schematic diagram for defining an elevation angle of a mobile terminal in an embodiment of the present disclosure.
Figure 6C:
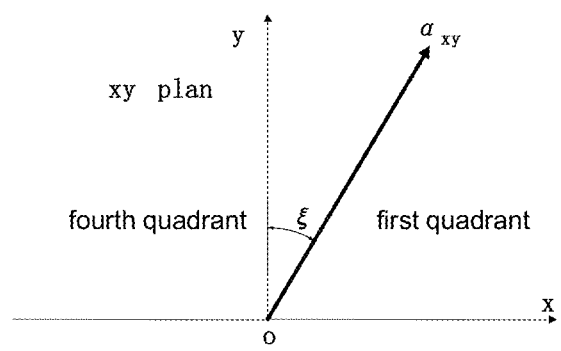
FIG. 6c is a schematic diagram for defining an azimuthal angle of a mobile terminal in an embodiment of the present disclosure.

As shown in FIG. 6a, a Cartesian coordinate system is established with the user as an original point, in which an x axis is horizontally left, a y axis is horizontally forward and a z axis is vertically upward. It is defined that a vector α in a positive direction of the mobile terminal as a unit vector perpendicular to the screen and directed at a reverse direction of a display direction of the screen. A component of the α vector on an yz plane is named as $\alpha_{yz}$, and an included angle θ between the $\alpha_{yz}$ and a positive direction of the z axis is defined as the elevation angle (see FIG. 6b). A projection of the α vector on the yz plane is $\alpha_{xy}$, and an included angle ξ between the $\alpha_{xy}$ and a positive direction of the y axis is defined as the azimuthal angle (see FIG. 6c). If the $\alpha_{xy}$ is located on a first quadrant of the xy plane, the ξ is positive; and if the $\alpha_{xy}$ is located on a fourth quadrant, the ξ is negative.

Except for the elevation angle and the azimuthal angle, other parameters of the mobile terminal may also be adopted to indicate the orientation of the mobile terminal.

In an embodiment, the shape of the background frame includes at least one of a height h of the background frame, a first included angle δ between a bottom edge and a side edge of the background frame or a second included angle μ between the bottom edge of the background frame and a bottom edge of the 3D image layer, where the second included angle μ in this embodiment of the present disclosure may be an obtuse angle, a flat angle or a reflex angle.

In some embodiments, the mobile terminal may adjust the height h of the background frame or/and the magnitude of the first included angle δ according to the elevation angle θ, so that the size or/and the form of the background frame changes. The elevation angle θ may be negatively correlated with the height h or/and the first included angle δ, i.e., along with the increase of the elevation angle θ, the height h or/and the first included angle δ is gradually reduced, and vice versa. Certainly, the elevation angle θ may be positively correlated with the height h or/and the first included angle δ.

Function relationships between the elevation angle θ and the height h and the first included angle δ may be respectively established as follows:

$$h = k_h \left(1 - \frac{\theta}{\theta_0}\right) h_0 \quad (1)$$

$$\delta = k_\delta \left(1 - \frac{\theta}{\theta_0}\right) \delta_0 \quad (2)$$

A change rule of the height h with the elevation angle θ is quantitatively described in the formula (1). A change rule of the first included angle δ with the elevation angle θ is quantitatively described in the formula (2). Herein, the h indicates the height of the background frame, the δ indicates the first included angle between the side edge and the bottom edge of the background frame, the $h_0$ indicates an initial height of the background frame and preferably $h_0$=H, the $\delta_0$ indicates an initial first included angle of the background frame and preferably $\delta_0$=90°, the $\theta_0$ indicates a constant for normalization of the θ and preferably $\theta_0$=90°, and the $k_h$ and the $k_\delta$ are linear change coefficients and it is recommended that $k_h$=1.0, $k_\delta$=1.5. In an embodiment, in a process of changing the shape of the background frame, the initial length $w_0$ of the bottom edge of the background frame is kept unchanged.

In combination with FIG. 5a and the formulas (1) and (2), it may be observed that while the elevation angle θ of the mobile terminal is increased, the height h and the first included angle δ of the background frame are linearly reduced. Although the background frame changes, it still keeps an isosceles trapezoid and the second included angle with the bottom edge of the 3D image layer is unchanged.

In some other embodiments, the mobile terminal may adjust the second included angle μ according to the size of the azimuthal angle ξ, so that the background frame is inclined. When the second included angle is adjusted, the second included angle may be adjusted by rotating the background frame for a certain angle with a reference point as a center according to the size of the azimuthal angle of the mobile terminal. Any point in the 3D image layer may be selected as the reference point, such as any point on the background frame is selected and preferably a vortex of the background frame is selected as the reference point. For example, when the mobile terminal is inclined rightward, a right lower vortex of the background frame is selected as the reference point, and the background frame is rotated rightward with the right lower vortex as the center. When the mobile terminal is inclined leftward, a left lower vortex of the background frame is selected as the reference point and the background frame is rotated leftward with the left lower vortex as the center.

The azimuthal angle ξ may be negatively correlated with the second included angle i.e., along with the increase of the azimuthal angle ξ, the second included angle μ is gradually reduced, and vice versa. Certainly, the azimuthal angle ξ may also be positively correlated with the second included angle μ. A following function relationship between the azimuthal angle ξ and the second included angle μ may be established:

$$\mu = \mu_0 - k \cdot \xi \quad (3)$$

A change rule of the azimuthal angle ξ with the second included angle μ is quantitatively described in the formula (3), where the μ is the second included angle between the bottom edge of the background frame and the bottom edge of the 3D image layer, the $\mu_0$ is the initial second included angle and preferably $\mu_0$=180°, the k is the linear change coefficient and it is recommended that k=0.3.

In combination with the formula (3) as well as FIG. 5b and FIG. 5c, it may be seen that if the mobile terminal is rotated along a horizontal direction clockwise by the user, the background frame 30 also rotates clockwise. In FIG. 5b, the background frame 30 rotates clockwise with a right lower vortex R as the center. On the contrary, if the mobile terminal is rotated counterclockwise, the background frame 30 also rotates counterclockwise. In FIG. 5c, the background frame 30 rotates counterclockwise with a left lower vortex L as the center.

Except for the height, the first included angle and the second included angle, other parameters may also be adopted to indicate the shape of the background frame.

In some embodiments, as long as the orientation of the mobile terminal changes, shape of the background frame changes too.

In other embodiments, a condition is set in advance. During an implementation process, whether the orientation of the mobile terminal meets the set condition or not is judged. When the orientation of the mobile terminal meets the set condition, the shape of the background frame is adjusted to a shape corresponding to the orientation of the mobile terminal. When the orientation of the mobile terminal does not meet the set condition, the current shape of the background frame is kept unchanged.

For example, when the orientation of the mobile terminal includes the elevation angle θ or the azimuthal angle ξ, whether the elevation angle θ or the azimuthal angle ξ of the mobile terminal is within a set range is judged. When the elevation angle θ or the azimuthal angle ξ of the mobile terminal is within the set range, it is determined that the orientation of the mobile terminal meets the set condition; or otherwise, it is determined that the orientation of the mobile terminal does not meet the set condition. Therefore, when the mobile terminal changes under some orientations, the background frame does not change too. On one hand, the change rule is met, the 3D effect is more vivid and the abnormal display is prevented; and on the other hand, a use habit of the user is met, the user is prevented from being affected to normally use the mobile terminal, and the user experience is improved.

An ordinary user generally holds the mobile terminal at the elevation angle of about 15° in normal use. At this moment, the 3D effect turns out to be unnecessary. Hence, a constraint condition may be provided for the θ, a first range θ∈[$\theta_{min}$, $\theta_{max}$] is set and θ∈[30°, 60°] may be set. According to the use habit of the user, a constraint condition may be provided for the ξ, a second range ξ∈[$\xi_{min}$, $\xi_{max}$] is set, and ξ∈[−60°, 60°] may be set.

For the elevation angle θ, if θ<$\theta_{min}$, the initial height or/and the first included angle of the background frame is kept unchanged. If θ>$\theta_{max}$, the θ is reset as a boundary value $\theta_{max}$. For the azimuthal angle ξ, if ξ<$\xi_{min}$, the ξ is reset a boundary value $\xi_{min}$; if ξ>$\xi_{max}$, the ξ is reset as a boundary value $\xi_{max}$. For example, if ξ=61°, the ξ is reset as 60°. Therefore, by setting the constraint condition, the 3D effect is prevented from displaying in default to affect the normal use of the user when the user holds the mobile terminal normally. Meanwhile, with the consideration to that the user generally does not hold the mobile terminal in a direction in which the elevation angle is greater than 60 or an absolute value of the azimuthal angle is greater than 60°, the set constraint condition is further beneficial to preventing the abnormal display and the user experience is improved.

At S14, the target object is drawn at a position of the target object on the 3D image layer.

In the step S14, when the target object is not completely accommodated within the background frame, the target object is drawn at the position of the target object on the 3D image layer. The drawn target object is stacked on the background frame and is overlapped with an original target object on the 3D image layer, so a portion blocked after the target object on the original 2D image is moved out of the background frame reappears on the 3D image layer. When the target object is drawn, it may be appropriate to completely draw the whole target object and may also be appropriate to only draw the portion, moved out of the background frame, of the target object on the 2D image.

For example, during specific implementation, the target object may be drawn effectively via a Canvas component and an OpenGLES technology under an Android system. Certainly, the drawing function may also be implemented by adopting other manners in the related art, which is not limited hereto.

Figure 7A:
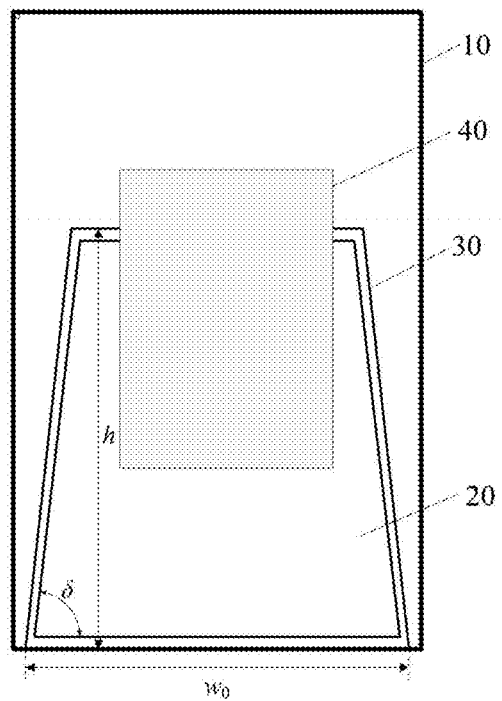
Figure 7B:
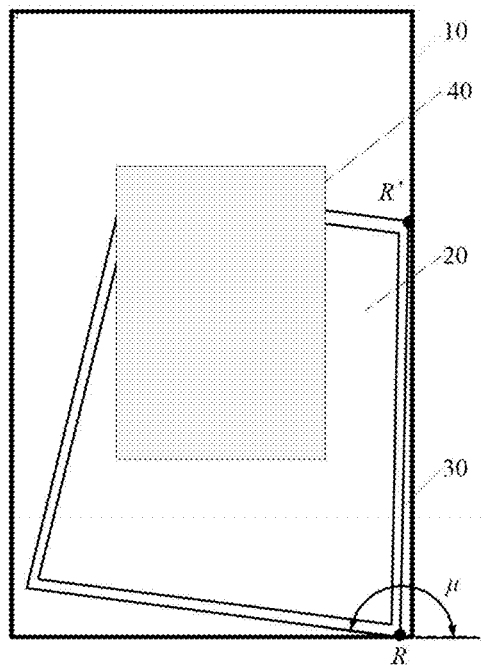
FIG. 7b is a schematic diagram after a target object is drawn on FIG. 5b.

As shown in FIG. 7a, FIG. 7b and FIG. 7c, which are results after the target object is redrawn respectively on the basis of FIG. 5a, FIG. 5b and FIG. 5c. After the target object is redrawn, the target object appears on the 3D image layer and the 3D effect is displayed immediately.

As shown in FIG. 8a1, FIG. 8a2, FIG. 8b and FIG. 8c, which are effect diagrams of the mobile terminal under different orientations after the image processing method in this embodiment of the present disclosure is adopted to process the 2D image shown in FIG. 2. A goat is taken as a target object in the figure, appears on the 3D image layer, and displays the vivid 3D effect.

FIG. 8a1 and FIG. 8a2 display an effect diagram of a change of a first included angle $\delta$ and a height h of the background frame with an elevation angle $\theta$ of a mobile terminal. As shown in FIG. 8a1, when the elevation angle $\theta$ of the mobile terminal is 42°, the height h of the background frame is respectively calculated to be 104 mm according to the formulas (1) and (2), and the first included angle $\delta$ is 72°. As shown in FIG. 8a2, when elevation angle $\theta$ of the mobile terminal is 49°, the height h of the background frame is respectively calculated to be 88 mm according to the formulas (1) and (2), and the first included angle $\delta$ is 61°. It may be seen that along with the gradual increase of the elevation angle $\theta$, the first included angle $\delta$ and the height h are gradually reduced, and the 3D perspective effect of the 3D image layer is more obvious.

Figure 8B:
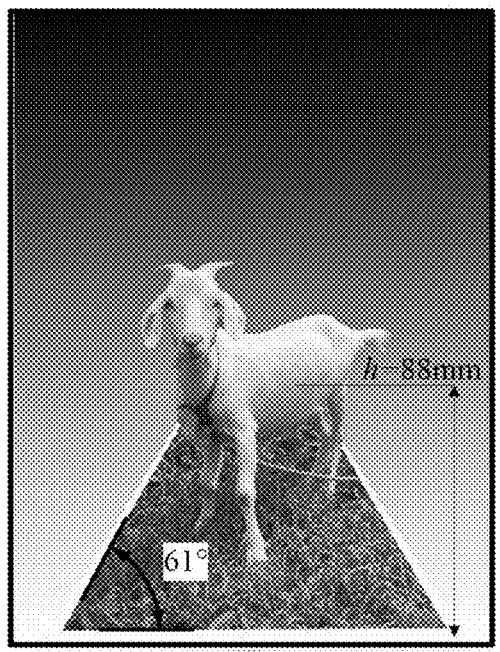
FIG. 8b is another 3D perspective effect diagram appeared at last after a 2D image in FIG. 2 is processed in an embodiment of the present disclosure.
Figure 8B:
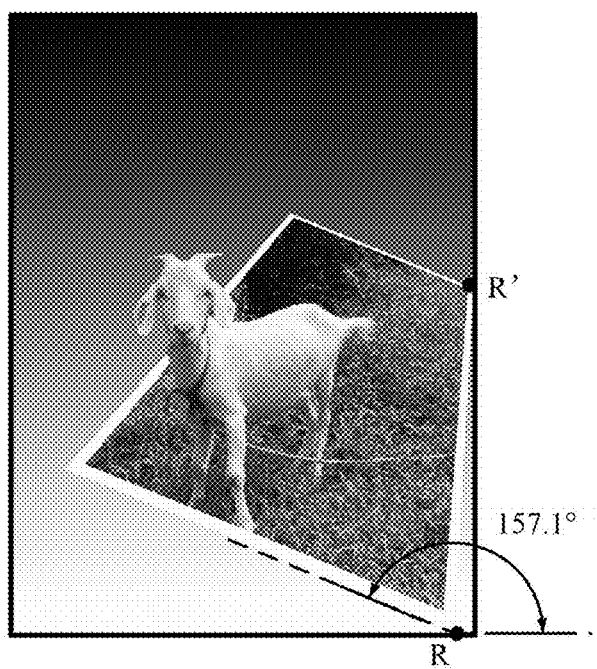
Figure 8C:
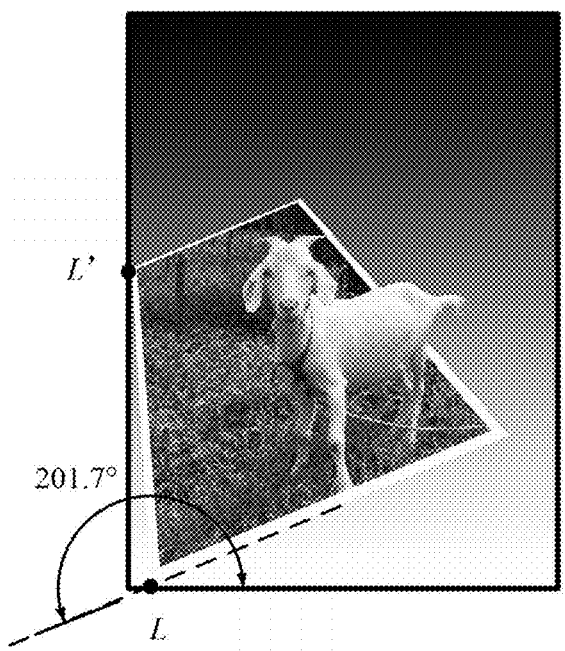
FIG. 8c is another 3D perspective effect diagram appeared at last after a 2D image in FIG. 2 is processed in an embodiment of the present disclosure.

FIG. 8b and FIG. 8c display an effect diagram of a change of a second included angle $\mu$, of a background frame with an azimuthal angle $\xi$ of a mobile terminal. As shown in FIG. 8b, when the azimuthal angle $\xi$ of the mobile terminal is 38.3°, the second included angle $\mu$ of the background frame is calculated to be 157.1° according to the formula (3), and the background frame is rotated to the second included angle $\mu$=157.1° with the right lower vortex R of the background frame as the center. As shown in FIG. 8c, when the azimuthal angle $\xi$ of the mobile terminal is 36.2°, the second included angle $\mu$ of the background frame is calculated to be 201.7° according to the formula (3), and the background frame is rotated to the second included angle $\mu$=201.7° with the left lower vortex L of the background frame as the center. It may be seen that along with the gradual increase of the azimuthal angle $\xi$, the second included angle $\mu$ is gradually reduced.

After the target object is drawn completely, the step S13 is returned, and the shape of the background frame is adjusted by continuously detecting the orientation of the mobile terminal.

Further, in some embodiments, after the step S13, an area out of the background frame on the 3D image layer is further filled with a background color (the target object drawn in the step S14 is stacked on the background color). The depth of the background color gradually changes from one direction to another direction, e.g., the background color gradually darkens or the color gradually becomes lighter from top to bottom (or from left to right). As shown in FIG. 8a1, FIG. 8a2, FIG. 8b and FIG. 8c, the filled background color gradually becomes lighter from top to bottom (e.g., a black top and a white bottom). The gradual changing color with the deep top and the shallow bottom can display an effect "from the near to the distant", thereby further enhancing the 3D effect.

According to the image processing method in this embodiment of the disclosure, by acquiring the target object of the 2D image, taking the 2D image as the background of the 3D image layer and creating the background frame, adjusting the shape of the background frame along with the change of the orientation of the mobile terminal so that the different areas of the 2D image are moved into or out of the background frame, and when the target object in the 2D image is moved out of the background frame, drawing the target object, a perspective effect is created, the target object appears on the 3D image layer to present a lifelike 3D perspective effect, and the effect that the 2D image is presented as the 3D effect on the mobile terminal is implemented.

By adopting the image processing method in the embodiment of the present disclosure, the implementation is simple, a perspective matrix does not need to be calculated, the calculated amount is low, the imaging speed is fast and thus it is very easy to implement on the mobile terminal; moreover, the operation is simple and convenient, and the user can adjust different 3D display effects by only changing the orientation of the mobile terminal; and meanwhile, by setting the constraint condition, the abnormal display may be prevented and thus the effect is stable and reliable.

Embodiment 2

Figure 9:
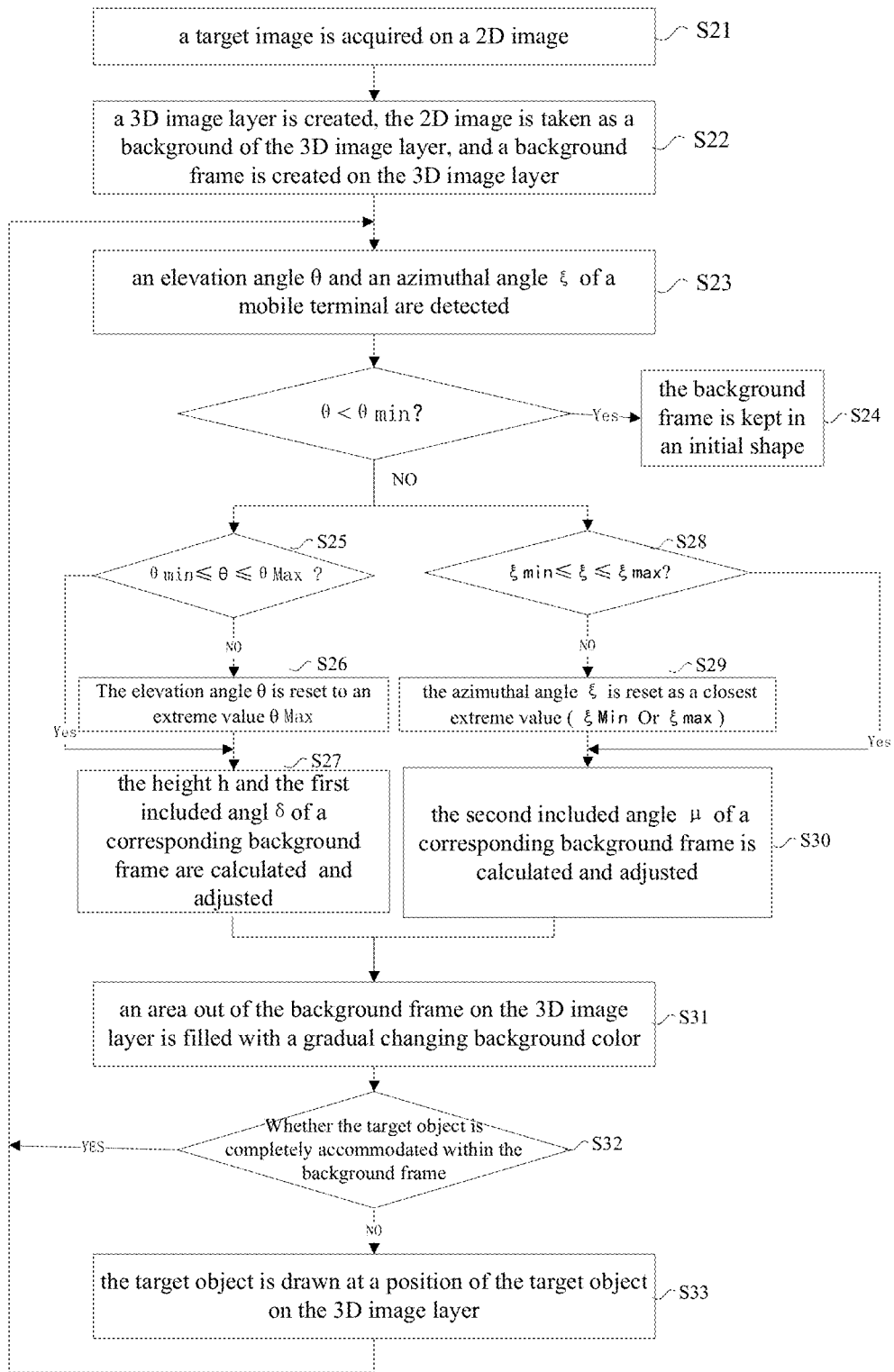
FIG. 9 is a flowchart of an image processing method according to a second embodiment of the present disclosure.

Referring to FIG. 9, a second embodiment of the present disclosure discloses an image processing method. The method includes the following steps.

At S21, a target image is acquired on a 2D image.

At S22, a 3D image layer is created, the 2D image is taken as a background of the 3D image layer, and a background frame is created on the 3D image layer.

In this embodiment, the step S21 and the step S22 are respectively the same as the step S11 and the step S12 in the first embodiment and will not be repeated herein.

As shown in FIG. 4, in this embodiment, a width W and a height H of the 3D image layer 10 are preferably equal to the width and the height of the 2D image 20, i.e., the 2D image 20 spreads across the whole 3D image layer 10. The initial width $w_0$ of the background frame 30 is slightly smaller than the W, the initial height $h_0$=H, the initial first included angle $\delta_0$=90°, the initial second included angle $\mu_0$=180°, the background frame 30 is in an initial shape and an original 2D image is seen by the user.

At S23, an elevation angle $\theta$ and an azimuthal angle $\xi$ of a mobile terminal are detected; whether the elevation angle $\theta$ is smaller than a lower limit $\theta_{min}$ ($\theta<\theta_{min}$?) or not is judged;

when the elevation angle θ is smaller than the lower limit, the step S24 is executed; and when the elevation angle θ is not smaller than the lower limit, the step S25 is executed.

At S24, the background frame is kept in an initial shape.

In this embodiment, a first range [$θ_{min}$, $θ_{max}$] is set for the elevation angle θ. When the elevation angle of the mobile terminal changes within the first range, the shape and the size (first included angle and height) of the background frame change with the elevation angle θ. Moreover, when the elevation angle θ is lower than the lower limit $θ_{min}$, the background frame is kept in the initial shape, i.e., the 2D image is displayed normally. With the consideration to that the user generally uses the mobile terminal normally at the elevation angle θ of about 15°, $θ_{min}$=30° may be set, i.e., when the user holds the mobile terminal at the elevation angle of smaller than 30°, the background frame is kept in the initial state and the 2D image is displayed normally. With the consideration to that the user does not hold the mobile terminal generally at the elevation angle of greater than 60°, $θ_{max}$=60° may be set, i.e., when the elevation angle of the mobile terminal is greater than 60°, the background frame still keeps the shape when in 60°. Therefore, in this embodiment, the set first range is [30°, 60°].

Certainly, in other embodiments, the first range may also be set as other angle intervals according to a demand.

At S25, whether the elevation angle θ is within the set first range [$θ_{min}$, $θ_{max}$] ($θ_{min}$≤θ≤$θ_{max}$?) or not is judged; when the elevation angle θ is within the first range, the step S27 is executed directly; and when the elevation angle θ is not within the first range, the step S26 is executed.

In the step S25, when the elevation angle θ is greater than the lower limit $θ_{min}$, the elevation angle θ is continuously compared with an upper limit $θ_{max}$. When θ<$θ_{max}$, it is determined that θ∈[$θ_{min}$, $θ_{max}$], i.e., the elevation angle is within the first range; and when θ>$θ_{max}$, it is determined that the elevation angle is not within the first range.

At S26, the elevation angle θ is reset to an extreme value $θ_{max}$.

When the elevation angle is not within the first range, it is indicated that θ>$θ_{max}$, and the θ is reset to $θ_{max}$. Therefore, after the height and the first included angle of the background frame are changed to an extreme value with the increase of the elevation angle of the mobile terminal, the elevation angle is increased continuously, and the height and the first included angle still keep the extreme value unchanged.

S27, a height h and a first included angle δ of a corresponding background frame are calculated according to the elevation angle θ, and the height h and the first included angle δ of the background frame are adjusted to calculated height value and angle value.

When the elevation angle is within the first range or the elevation angle is reset to the extreme value, according to a corresponding relationship (function relationship) between the elevation angle and the height, such as the formula (1), a height value of the height h corresponding to an angle value of the current elevation angle θ is calculated; according to a corresponding relationship between the elevation angle and the first included angle, such as the formula (2), an angle value of the first included angle δ corresponding to an angle value of the current elevation angle θ is calculated; and then, the height and the first included angle of the background frame are adjusted to the calculated height value and angle value.

At S28, whether the azimuthal angle ξ is within a set second range [$ξ_{min}$, $ξ_{max}$] ($ξ_{min}$≤ξ≤$ξ_{max}$?) is judged; when the azimuthal angle ξ is within the set second range, the step S30 is executed directly; and when the azimuthal angle ξ is not within the second range, the step S29 is executed.

In this embodiment, a second range [$ξ_{min}$, $ξ_{max}$] is set for the azimuthal angle ξ. When the azimuthal angle of the mobile terminal changes within the second range, the inclination (the second included angle) of the background frame changes with the change of the azimuthal angle ξ. With the consideration to that the user does not hold the mobile terminal generally at the azimuthal angle of greater than 60°, $ξ_{max}$=60°, $ξ_{min}$=−60° may be set, i.e., when the elevation angle of the mobile terminal is greater than 60° or is smaller than −60°, the background frame still keeps the shape when in 60° or −60°. Therefore, in this embodiment, the set second range is [−60°, 60°].

Certainly, in other embodiments, the second range may also be set as other angle intervals according to a demand.

When the elevation angle θ is greater than or equal to a lower limit $θ_{min}$, the azimuthal angle ξ is compared with the $ξ_{min}$, and the $ξ_{max}$. When $ξ_{min}$≤ξ≤$ξ_{max}$, it s determined that ξ∈[$ξ_{min}$, $ξ_{max}$], i.e., the azimuthal angle is within the second range; and when ξ>$ξ_{max}$ or ξ<$ξ_{min}$, it is determined that the azimuthal angle is not within the second range.

At S29, the azimuthal angle ξ is reset as a closest extreme value ($ξ_{min}$ or $ξ_{max}$).

Specifically, when the azimuthal angle ξ>$ξ_{max}$, the ξ is reset as the $ξ_{max}$. When the azimuthal angle ξ<$ξ_{min}$, the ξ is reset as the $ξ_{min}$. In other words, when the second included angle of the background frame is changed to an extreme value along with the increase or decrease of the azimuthal angle of the mobile terminal, even through the azimuthal angle is increased or decreased continuously, the second included angle still keeps the extreme value unchanged.

At S30, a second included angle μ of a corresponding background frame is calculated according to the azimuthal angle ξ, and the second included angle μ of the background frame is adjusted as the calculated angle value.

When the azimuthal angle is within the second range or the azimuthal angle is reset to the extreme value, according to a corresponding relationship between the azimuthal angle and the second included angle, such as the formula (3), an angle value of the second included angle μ corresponding to the angle value of the current azimuthal angle ξ is calculated; and then, the second included angle of the background frame is adjusted to the calculated angle value.

When the second included angle is adjusted, the second included angle may be adjusted by rotating the background frame for a certain angle with a reference point as a center according to the size of the azimuthal angle of the mobile terminal. Any point in the 3D image layer may be selected as the reference point, such as any point on the background frame is selected and preferably a vortex of the background frame is selected as the reference point. For example, when the mobile terminal is inclined rightward, a right lower vortex of the background frame is selected as the reference point, and the background frame is rotated clockwise with the right lower vortex as the center. When the mobile terminal is inclined leftward, a left lower vortex of the background frame is selected as the reference point and the background frame is rotated counterclockwise with the left lower vortex as the center.

At S31, an area out of the background frame on the 3D image layer is filled with a gradual changing background color.

The gradual changing background color refers to that the depth of the background color is gradually changed from one direction to another direction, such as gradually becoming dark or gradually becoming shallow. As shown in FIG.

8a1, FIG. 8a2, FIG. 8b and FIG. 8c, the filled background color gradually becomes lighter from top to bottom (e.g., a black top and a white bottom). The gradual changing color with the deep top and the shallow bottom can display an effect "from the near to the distant", thereby further enhancing the 3D effect.

At S32, whether the target object is completely accommodated within the background frame or not is judged; when the target object is not completely accommodated within the background frame, the step S33 is executed and the target object is drawn; and when the target object is completely accommodated within the background frame, the target object is not drawn, the step S23 is returned, and the background frame is adjusted by continuously detecting the elevation angle and the azimuthal angle of the mobile terminal.

In the step S32, after the height, the first included angle and the second included angle of the background frame are adjusted according to the elevation angle and the azimuthal angle of the mobile terminal, whether the target object is completely accommodated within the background frame or not is judged. When the target object is moved out of the background frame completely or partially, it is determined that the target object is not completely accommodated within the background frame; or otherwise, it is determined that the target object is completely accommodated within the background frame.

S33, the target object is drawn at a position of the target object on the 3D image layer.

The step S33 is the same as the step S14 in the first embodiment and will not be repeated herein.

See FIG. 8a1, FIG. 8a2, FIG. 8b and FIG. 8c, which are effect diagrams of the mobile terminal under different orientations after the image processing method in this embodiment of the present disclosure is adopted to process the 2D image shown in FIG. 2. A goat is taken as a target object in the figure, appears on the 3D image layer, and displays the vivid 3D effect.

FIG. 8a1 and FIG. 8a2 display an effect diagram of a change of a first included angle δ and a height h of the background frame with an elevation angle θ of a mobile terminal. As shown in FIG. 8a1, when the elevation angle θ of the mobile terminal is 42°, the height h of the background frame is respectively calculated to be 104 mm according to the formulas (1) and (2), and the first included angle δ is 72°. As shown in FIG. 8a2, when elevation angle θ of the mobile terminal is 49°, the height h of the background frame is respectively calculated to be 88 mm according to the formulas (1) and (2), and the first included angle δ is 61°. It may be seen that along with the gradual increase of the elevation angle θ, the first included angle δ and the height h are gradually reduced, and the 3D perspective effect of the 3D image layer is more obvious.

FIG. 8b and FIG. 8c display an effect diagram of a change of a second included angle μ, of a background frame with an azimuthal angle ξ of a mobile terminal. As shown in FIG. 8b, when the azimuthal angle ξ of the mobile terminal is 38.3°, the second included angle μ of the background frame is calculated to be 157.1° according to the formula (3), the background frame is rotated to the second included angle μ=157.1° with the right lower vortex R of the background frame as the center and the constraint condition that may be set for rotation is that a point R' at an upper edge of the background frame cannot be beyond a right boundary of the 3D image layer, i.e., when the point R' contacts the right boundary, the second included angle μ is up to the extreme value, and even though the azimuthal angle ξ is increased continuously, the second included angle μ still keep the extreme value unchanged. As shown in FIG. 8c, when the azimuthal angle ξ of the mobile terminal is −36.2°, the second included angle μ of the background frame is calculated to be 201.7° according to the formula (3), the background frame is rotated to the second included angle μ=201.7° with the left lower vortex L of the background frame as the center, and the constraint condition that may be set for rotation is that a point L' at the upper edge of the background frame cannot be beyond a left boundary of the 3D image layer, i.e., when the point L' contacts the left boundary, the second included angle μ is up to the extreme value, and even though the azimuthal angle ξ is decreased continuously, the second included angle μ still keep the extreme value unchanged.

After the target object is drawn completely, the step S23 is returned, and the shape of the background frame is adjusted by continuously detecting the elevation angle and the azimuthal angle of the mobile terminal.

According to the image processing method in this embodiment of the present disclosure, the user may adjust different 3D perspective effects by changing the elevation angle and the azimuthal angle of the mobile terminal, and thus the operation is simple and convenient, and the user experience is improved. Moreover, by setting the constraint condition, the user holds the mobile terminal at a normal orientation, the mobile terminal displays a normal 2D image and the normal use of the user is guaranteed; and meanwhile, the abnormal display due to an abnormal angle of the mobile terminal is further prevented, and the stability of the display effect is improved.

In this embodiment, when the elevation angle and the azimuthal angle of the mobile terminal change, the height, the first included angle and the second included angle of the background frame also change, and thus the very lifelike 3D perspective effect is presented.

In an embodiment, in some embodiments, as long as the elevation angle of the mobile terminal changes, the height of the background frame also changes. In other embodiments, as long as the elevation angle of the mobile terminal changes, the first included angle of the background frame also changes. In still other embodiments, as long as the azimuthal angle of the mobile terminal changes, the second included angle of the background frame also changes. In addition, any two of the three technical solutions may further combined to form a new technical solution.

In the foregoing embodiments, the corresponding relationship between the elevation angle of the mobile terminal and the height and the first included angle of the background frame as well as the corresponding relationship between the azimuthal angle of the mobile terminal and the second included angle of the background frame both are a linear function relationship, i.e., the background frame rotates linearly and deforms linearly along with the change in the elevation angle and the azimuthal angle of the mobile terminal. As a matter of fact, the relationship between the height and the first included angle of the background frame and the elevation angle of the mobile terminal, as well as the relationship between the second included angle of the background frame and the azimuthal angle of the mobile terminal, may further be described by constructing a nonlinear function relationship (such as a triangular function relationship). The description will be given below with the triangular function relationship as an example.

Figure 10:
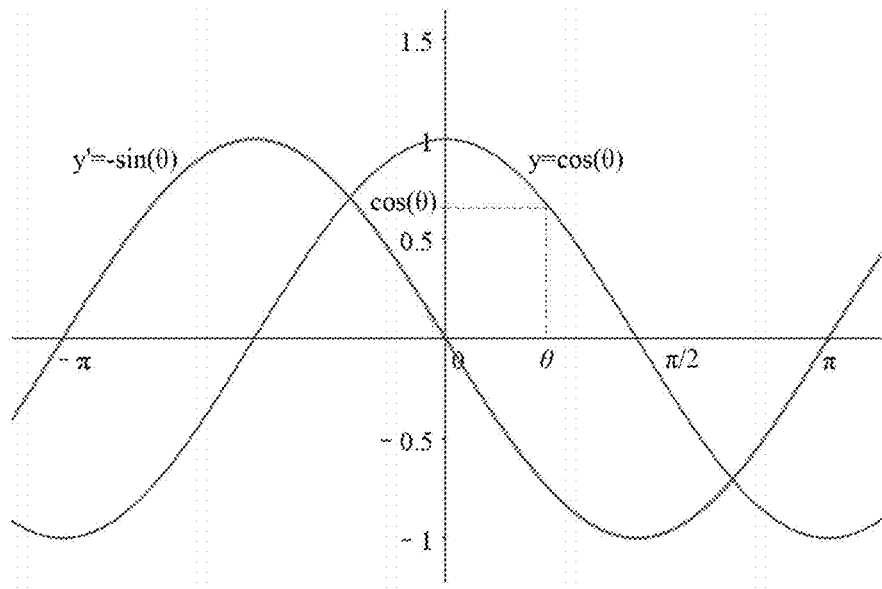
FIG. 10 is a schematic diagram of a trigonometric function.

See FIG. 10, which shows a waveform of a triangular function $y=\cos(\theta)$ and a derivative $y'=-\sin(\theta)$ thereof in a range from $-\pi$ to $\pi$. It may be seen that when $0 \sim \pi/2$, the y is decreased with the increase of the θ, and the decrease rate is gradually increased (see a change rule of a derivative y'). It is indicated that when the user changes the direction of the mobile terminal on the yz plane at a same angular velocity, the y value changes nonlinearly and the change rate is gradually increased. Therefore, by introducing the cos(θ) and the Sin(θ) to the formulas (1), (2) and (3), formulas (4), (5) and (6) may be obtained.

$$h = k_h \cdot \cos(\theta) \cdot h_0 \quad (4)$$

$$\delta = k_\delta \cdot \cos(\theta) \cdot \delta_0 \quad (5)$$

Preferably, $k_h = 1.0 = 1.5$, $h_0 = H$, $\delta_0 = \theta_0 = 90°$, $\theta \in [30°, 60°]$ $$\mu = \mu_0 \cdot (1 - k \cdot \sin(\xi)) \quad (6)$$

Preferably, $\mu = 180°$, $\xi \in [-60°, 60°]$, $k > 0$.

Compared with the linear change described in the formula (1) to the formula (3), with the nonlinear transformation described in the formula (4) to the formula (6) obtained by introducing the cos(θ) and the sin(θ), a completely different experience may be brought to the user.

It may be understood by the person skilled in the art that other function relationships may further be adopted and will not be repeated one by one.

Embodiment 3

Figure 11:
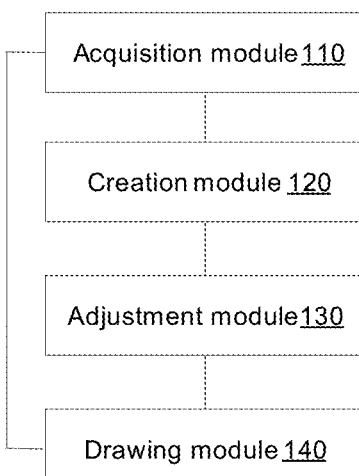
FIG. 11 is a modular schematic diagram of an image processing apparatus according to a third embodiment of the present disclosure.

Referring to FIG. 11, a third embodiment of the present disclosure discloses an image processing apparatus. The apparatus is applied to a mobile terminal, and may include an acquisition module 110, a creation module 120, an adjustment module 130 and a drawing module 140.

The acquisition module 110 is configured to acquire a target image on a 2D image.

The creation module 120 is configured to create a 3D image layer, take the 2D image as a background of the 3D image layer, and create a background frame on the 3D image layer.

The adjustment module 130 is configured to detect an orientation of a mobile terminal, and adjust a shape of the background frame according to the orientation of the mobile terminal, so that different areas of the 2D image are moved into or out of the background frame.

The drawing module 140 is configured to draw, when the target object on the 2D image is not completely accommodated within the background frame, the target object at a position of the target object on the 3D image layer, wherein the 2D image, the background frame, and the drawn target object on the 3D image layer are sequentially stacked from bottom to top.

In an embodiment, the orientation of the mobile terminal may include an elevation angle or/and an azimuthal angle of the mobile terminal; and the shape of the background frame may include at least one of a height of the background frame, a first included angle between a bottom edge and a side edge of the background frame or a second included angle between the bottom edge of the background frame and a bottom edge of the 3D image layer.

In some embodiments, the adjustment module 130 may adjust the height or/and the first included angle of the background frame according to the elevation angle of the mobile terminal. Preferably, the elevation angle is negatively correlated with the height or/and the first included angle of the background frame.

In other embodiments, the adjustment module 130 may adjust the second included angle according to the size of the azimuthal angle of the mobile terminal. Specifically, the adjustment module 130 may adjust the second included angle by rotating the background frame for a certain degree with a reference point as a center, where the reference point preferably is a vortex of the background frame, such as a left lower vortex or a right lower vortex. In an embodiment, the azimuthal angle is negatively correlated with the second included angle.

In some embodiments, as long as the orientation of the mobile terminal changes, the adjustment module 130 adjusts the shape of the background frame.

In other embodiments, a condition is set in advance. During implementation, the adjustment module 130 judges whether the orientation of the mobile terminal meets the set condition. When the orientation of the mobile terminal meets the set condition, the shape of the background frame is adjusted to a shape corresponding to the orientation of the mobile terminal; and when the orientation of the mobile terminal does not meet the set condition, the current shape of the background frame is kept unchanged. For example, when the orientation of the mobile terminal includes the elevation angle or the azimuthal angle of the mobile terminal, the adjustment module 130 judges whether the elevation angle or the azimuthal angle of the mobile terminal is within a set range. When the elevation angle or the azimuthal angle of the mobile terminal is within the set range, it is determined that the orientation of the mobile terminal meets the set condition; or otherwise, it is determined that the orientation of the mobile terminal does not meet the set condition.

The drawing module 140 may completely draw the whole target object when drawing the target object, and may also only draw a portion, moved out of the background frame, of the target object on the 2D image.

According to the image processing apparatus in this embodiment of the disclosure, by acquiring the target object of the 2D image, taking the 2D image as the background of the 3D image layer and creating the background frame, adjusting the shape of the background frame along with a change of the orientation of the mobile terminal so that the different areas of the 2D image are moved into or out of the background frame, and when the target object in the 2D image is moved out of the background frame, drawing the target object, a perspective effect is created, the target object appears on the 3D image layer to present a lifelike 3D perspective effect, and the effect that the 2D image is presented as the 3D effect on the mobile terminal is implemented.

By adopting the image processing apparatus in this embodiment of the present disclosure, when the 2D image is presented as the 3D effect, a perspective matrix does not need to be calculated, the calculated amount is low, the imaging speed is fast and thus it is very easy to implement on the mobile terminal; moreover, the operation is simple and convenient, and a user can adjust different 3D display effects by only changing the orientation of the mobile terminal; and meanwhile, by setting a constraint condition, the abnormal display may be prevented and thus the effect is stable and reliable.

Embodiment 4

Figure 12:
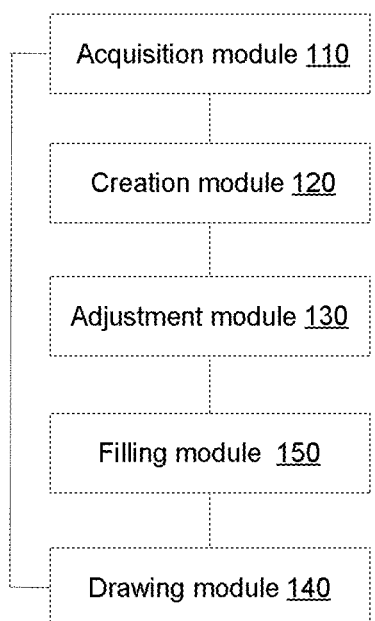
FIG. 12 is a modular schematic diagram of an image processing apparatus according to a fourth embodiment of the present disclosure.

Referring to FIG. 12, a fourth embodiment of the present disclosure discloses an image processing apparatus. The difference of this embodiment from the third embodiment lines in that a filling module 150 is increased. The filling module 150 is configured to fill, after the adjustment module 130 adjusts the shape of the background frame, a background color in an area out of the background frame on the 3D image layer. At this moment, the 2D image, the background frame, the background color and the drawn target object on the 3D image layer are sequentially stabled from bottom to top. The depth of the background color gradually changes from one direction to another direction, such as gradually becoming dark or gradually becoming shallow.

As shown in FIG. 8a1, FIG. 8a2, FIG. 8b and FIG. 8c, the filled background color gradually becomes lighter from top to bottom (e.g., a black top and a white bottom). The gradual changing color with the deep top and the shallow bottom can display an effect "from the near to the distant", thereby further enhancing the 3D effect.

It is to be noted that the image processing method and the image processing method provided by the embodiments pertain to a same concept, and the specific implementation process is referred to the method embodiment. Technical features in the method embodiment are also applied to the apparatus embodiment, and will not be repeated here.

With the description on the above embodiments, a person skilled in the art may clearly know that the method in the embodiment may be implemented via a manner of software and a necessary universal hardware platform, and certainly, may also be implemented via hardware. However, in most cases, the former is a better implementation manner. Based on such an understanding, the technical solutions of the embodiments of the present disclosure substantially or parts making contributions to the conventional art may be embodied in form of software product, and the computer software product is stored in a storage medium (such a Random-Only Medium (ROM)/Random-Access Memory (RAM), a magnetic disk and an optical disc), including a plurality of instructions configured to enable a piece of computer equipment (which may be a mobile phone, a computer, a server, network equipment or the like) to execute all or part of the method in each embodiment of the present disclosure.

The above describes the preferred embodiments of the present disclosure with reference to accompanying drawings and is not intended to limit a scope of claims of the present disclosure. The person skilled in the art may make various variant solutions to implement the present disclosure without departing from the scope and essence of the present disclosure, e.g., the features of one embodiment may be used in another embodiment to obtain a still another embodiment. Any modification, equivalent replacement and improvement made within the technical concept of the present disclosure all should be fallen into the scope of the claims of the present disclosure.

INDUSTRIAL APPLICABILITY

As mentioned above, the image processing method and apparatus provided by the embodiments of the present disclosure have the following beneficial effects: by acquiring the target object of the 2D image, taking the 2D image as the background of the 3D image layer and creating the background frame, adjusting the shape of the background frame along with a change of the orientation of the mobile terminal so that the different areas of the 2D image are moved into or out of the background frame, and when the target object in the 2D image is moved out of the background frame, drawing the target object, a perspective effect is created, the target object appears on the 3D image layer to present a lifelike 3D perspective effect, and the effect that the 2D image is presented as the 3D effect on the mobile terminal is implemented.

By adopting the image processing method in the embodiments of the present disclosure, the implementation is simple, a perspective matrix does not need to be calculated, the calculated amount is low, the imaging speed is fast and thus it is very easy to implement on the mobile terminal; moreover, the operation is simple and convenient, and a user can adjust different 3D display effects by only changing the orientation of the mobile terminal; and meanwhile, by setting a constraint condition, the abnormal display may be prevented and thus the effect is stable and reliable.

What is claimed is:

1. An image processing method, applied to a mobile terminal and comprising:
    acquiring a target object on a Two-Dimensional (2D) image;
    creating a Three-Dimensional (3D) image layer, taking the 2D image as a background of the 3D image layer, and creating a background frame on the 3D image layer;
    detecting an orientation of a mobile terminal, and adjusting a shape of the background frame according to the orientation of the mobile terminal, so that different areas of the 2D image are moved into or out of the background frame; and
    when the target object on the 2D image is not completely accommodated within the background frame, drawing the target object at a position of the target object on the 3D image layer,
    wherein the 2D image, the background frame, and the drawn target object on the 3D image layer are sequentially stacked from bottom to top.

2. The image processing method as claimed in claim 1, wherein the orientation of the mobile terminal comprises an elevation angle or/and an azimuthal angle of the mobile terminal; and the shape of the background frame comprises at least one of: a height of the background frame, a first included angle formed by a bottom edge and a side edge of the background frame, a second included angle formed by the bottom edge of the background frame and a bottom edge of the 3D image layer.

3. The image processing method as claimed in claim 2, wherein the adjusting a shape of the background frame according to the orientation of the mobile terminal comprises:
    adjusting the height of the background frame or/and the first included angle of the background frame according to the elevation angle of the mobile terminal.

4. The image processing method as claimed in claim 3, wherein the elevation angle is negatively correlated with the height or/and the first included angle of the background frame.

5. The image processing method as claimed in claim 4, after the step of adjusting a shape of the background frame according to the orientation of the mobile terminal, further comprising:
    filling a background color in an area out of the background frame on the 3D image layer, wherein a depth of the background color gradually changes from one direction to another direction.

6. The image processing method as claimed in claim 3, after the step of adjusting a shape of the background frame according to the orientation of the mobile terminal, further comprising:
    filling a background color in an area out of the background frame on the 3D image layer, wherein a depth of the background color gradually changes from one direction to another direction.

7. The image processing method as claimed in claim 2, wherein the adjusting a shape of the background frame according to the orientation of the mobile terminal comprises:
   adjusting the second included angle according to the azimuthal angle of the mobile terminal.

8. The image processing method as claimed in claim 7, wherein the azimuthal angle is negatively correlated with the second included angle.

9. The image processing method as claimed in claim 7, wherein the adjusting the second included angle according to the azimuthal angle of the mobile terminal comprises: according to the size of the azimuthal angle of the mobile terminal, rotating the background frame for a certain angle with a reference point as a center to adjust the size of the second included angle.

10. The image processing method as claimed in claim 9, wherein the reference point is a vertex of the background frame.

11. The image processing method as claimed in claim 7, after the step of adjusting a shape of the background frame according to the orientation of the mobile terminal, further comprising:
   filling a background color in an area out of the background frame on the 3D image layer, wherein a depth of the background color gradually changes from one direction to another direction.

12. The image processing method as claimed in claim 2, wherein the adjusting a shape of the background frame according to the orientation of the mobile terminal comprises:
   judging whether the orientation of the mobile terminal meets a set condition;
   when the orientation of the mobile terminal meets the set condition, adjusting the shape of the background frame to a shape corresponding to the orientation of the mobile terminal; and
   when the orientation of the mobile terminal does not meet the set condition, keeping a current shape of the background frame unchanged.

13. The image processing method as claimed in claim 12, wherein when the orientation of the mobile terminal comprises the elevation angle or the azimuthal angle of the mobile terminal, the judging whether the orientation of the mobile terminal meets a set condition comprises:
   judging whether the elevation angle or the azimuthal angle of the mobile terminal is within a set range; and
   when the elevation angle or the azimuthal angle of the mobile terminal is within the set range, determining that the orientation of the mobile terminal meets the set condition; or otherwise, determining that the orientation of the mobile terminal does not meet the set condition.

14. The image processing method as claimed in claim 2, after the step of adjusting a shape of the background frame according to the orientation of the mobile terminal, further comprising:
   filling a background color in an area out of the background frame on the 3D image layer, wherein a depth of the background color gradually changes from one direction to another direction.

15. The image processing method as claimed in claim 1, after the step of adjusting a shape of the background frame according to the orientation of the mobile terminal, further comprising:
   filling a background color in an area out of the background frame on the 3D image layer, wherein a depth of the background color gradually changes from one direction to another direction.

16. A non-volatile storage medium, configured to store a computer program for executing the image processing method as claimed in claim 1.

17. An image processing apparatus, applied to a mobile terminal and comprising:
   an acquisition module, configured to acquire a target object on a Two-Dimensional (2D) image;
   a creation module, configured to create a Three-Dimensional (3D) image layer, take the 2D image as a background of the 3D image layer, and create a background frame on the 3D image layer;
   an adjustment module, configured to detect an orientation of a mobile terminal, and adjust a shape of the background frame according to the orientation of the mobile terminal, so that different areas of the 2D image are moved into or out of the background frame; and
   a drawing module, configured to draw when the target object on the 2D image is not completely accommodated within the background frame, the target object at a position of the target object on the 3D image layer,
   wherein the 2D image, the background frame, and the drawn target object on the 3D image layer are sequentially stacked from bottom to top.

18. The image processing apparatus as claimed in claim 17, wherein the orientation of the mobile terminal comprises an elevation angle or/and an azimuthal angle of the mobile terminal; and the shape of the background frame comprises at least one of: a height of the background frame, a first included angle formed by a bottom edge and a side edge of the background frame, a second included angle formed by the bottom edge of the background frame and a bottom edge of the 3D image layer.

19. The image processing apparatus as claimed in claim 18, further comprising:
   a filling module, configured to fill, after the adjustment module adjusts the shape of the background frame, a background color in an area out of the background frame on the 3D image layer, wherein a depth of the background color gradually changes from one direction to another direction.

20. The image processing apparatus as claimed in claim 17, further comprising:
   a filling module, configured to fill, after the adjustment module adjusts the shape of the background frame, a background color in an area out of the background frame on the 3D image layer, wherein a depth of the background color gradually changes from one direction to another direction.

* * * * *